United States Patent [19]
Denny

[11] Patent Number: 5,485,900
[45] Date of Patent: Jan. 23, 1996

[54] BRAKE LOCKOUT DEVICE

[75] Inventor: Martin L. Denny, Des Moines, Iowa

[73] Assignee: Dico, Inc., Des Moines, Iowa

[21] Appl. No.: 215,703

[22] Filed: Mar. 22, 1994

[51] Int. Cl.$^6$ ..................................................... B60T 7/20
[52] U.S. Cl. .................. 188/112 R; 188/142; 280/446.1
[58] Field of Search ............................... 188/3 R, 112 R, 188/144, 142; 303/7; 280/446.1, 482, 512

[56] References Cited

U.S. PATENT DOCUMENTS

| | | | |
|---|---|---|---|
| 3,783,982 | 1/1974 | Wells | 188/112 |
| 3,881,577 | 5/1975 | Wherry et al. | 188/112 |
| 4,239,252 | 12/1980 | Huetsch et al. | 280/512 X |
| 5,013,059 | 5/1991 | Goettker | 188/112 X |

Primary Examiner—Robert J. Oberleitner
Assistant Examiner—Lee W. Young
Attorney, Agent, or Firm—Brian J. Laurenzo; Kent A. Herink

[57] ABSTRACT

An automatic brake lockout for restricting operation of a trailer hitch surge suppressor as a trailer is being backed by a pulling vehicle. The automatic brake lockout works on a two-part trailer hitch with a first member sliding toward a second member to activate the surge suppressor. When actuated, the automatic brake lockout restricts movement of the first member toward the second member to allow the trailer to be backed without the surge suppressor being actuated. Once the trailer has been adequately backed, the pulling vehicle need only move slightly forward to release the automatic brake lockout device and leave the surge suppressor operable.

3 Claims, 4 Drawing Sheets

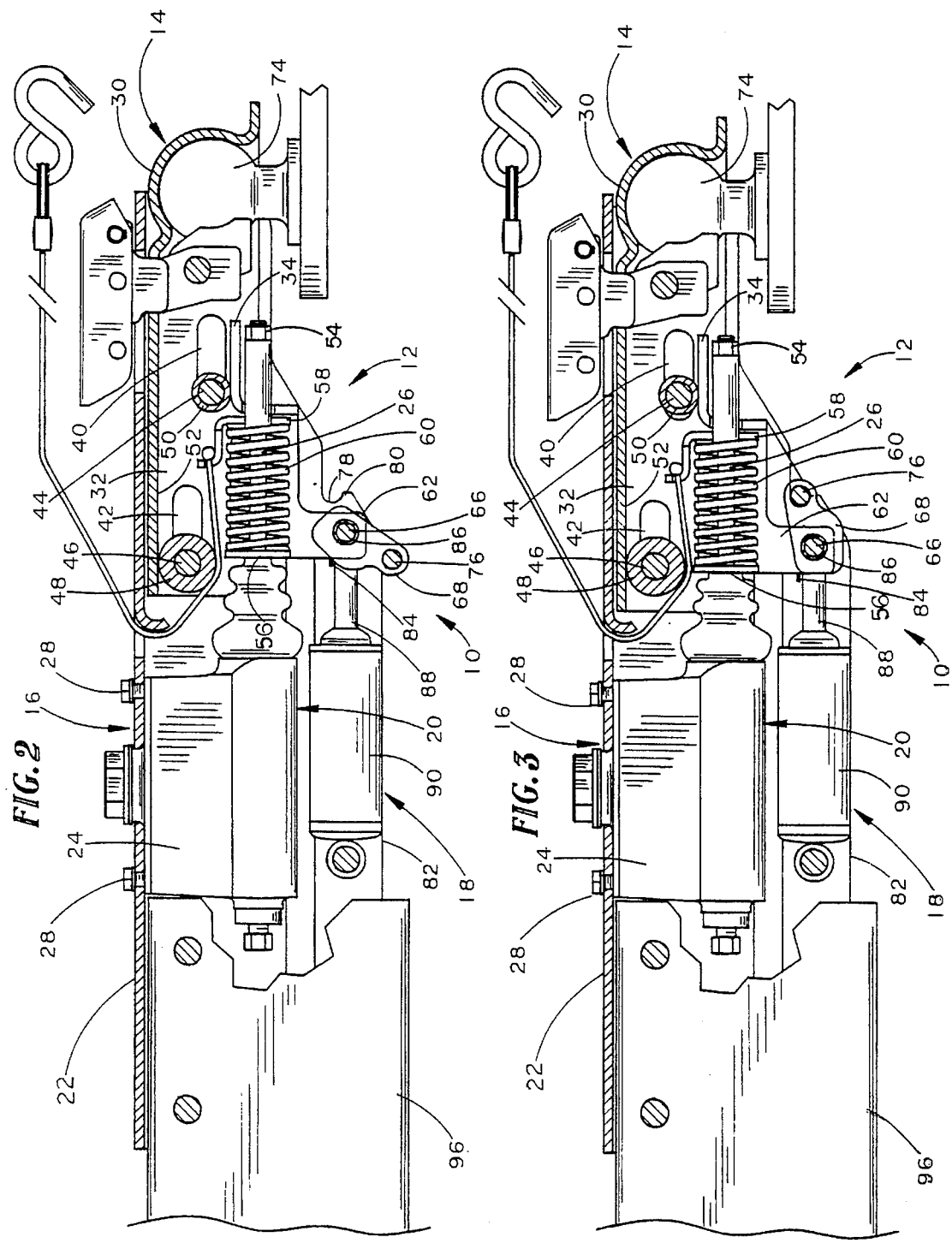

BRAKE LOCKOUT DEVICE

BACKGROUND OF THE INVENTION

The present invention relates generally to trailer braking systems and, more particularly, to an apparatus for locking out a trailer brake surge suppressor when a pulling vehicle, mounted to the trailer, is backed up.

Surge suppression mechanisms operably connected to trailer brakes are well known in the art. These mechanisms generally operate to activate a braking mechanism of a trailer as a pulling vehicle begins to slow. As the trailer continues forward, the braking mechanism is automatically actuated to prevent the trailer from moving into the pulling vehicle, and from adding unnecessary momentum to the pulling vehicle as the pulling vehicle attempts to slow in relationship to the trailer.

Trailer brake surge suppressors generally consist of a two-part hitch, the forward portion being coupled to a pulling vehicle and the rearward portion being coupled to a trailer. The surge suppression aspect of the braking mechanism works by actuating the trailer brake when the rearward portion of the mechanism moves toward the forward portion of the mechanism. In a situation where a pulling vehicle is slowing down or moving downhill, the mechanism helps to slow the trailer. In these situations, actuation of the trailer brake pulls the rearward portion of the mechanism away from the forward portion of the mechanism until the surge suppressor releases the trailer brake.

Although the aforementioned prior art devices work very well at preventing a trailer from passing an excessive amount of momentum on to a pulling vehicle, it is very difficult for a pulling vehicle to back a trailer having such a surge suppression mechanism. As the pulling vehicle backs up, the forward portion of the mechanism is moved toward the rearward portion of the mechanism, thereby actuating the trailer brakes and preventing the pulling vehicle from moving the trailer rearwardly.

The difficulties encountered in the prior art discussed hereinabove are substantially eliminated by the present invention.

SUMMARY OF THE INVENTION

According, it is an object of the present invention to provide an apparatus for locking out the surge suppression mechanism of a trailer as the trailer is being moved rearwardly.

It is another object of the present invention to provide a durable lockout for a trailer brake surge suppressor.

It is another object of the present invention it is to provide an apparatus for locking out the surge suppressor of a trailer brake which automatically releases the surge suppressor when the trailer is pulled forward.

Still another object of the present invention is to provide a lockout for a trailer brake surge suppressor which is easy to operate.

By the present invention, it is proposed to overcome the difficulties encountered heretofore. To this end, a brake lockout apparatus is provided for restricting operation of a trailer hitch surge suppressor. The brake lockout is of a construction that when the brake lockout is engaged, operation of the trailer hitch surge suppressor remains restricted as a trailer hitch, operably coupled to the trailer hitch surge suppressor is moved rearwardly, and remains restricted until the brake lockout apparatus is disengaged. The brake lockout apparatus has first and second hitch members operably coupled to the surge suppressor and operably coupled to each other for slidable movement in relationship to one another. The connection is such that the surge suppressor is activated when the first hitch member moves toward the second hitch member, and deactivated when the first hitch member moves away from the second hitch member. The brake lockout apparatus is also provided with a catch operably connected to the first hitch member. Operably connected to the second hitch member is a keeper which is capable of retaining the catch to prevent movement of the first hitch toward the second hitch, thereby restricting operation of the surge suppressor.

Preferably, the first hitch member is provided with a notch and the second surge member is pivotally connected to a pin which pivots into and engages the notch, to restrict movement of the first hitch member in relationship to the second hitch member. Also preferably, the brake lockout apparatus is provided with an automatic release means for disengaging the pin from the notch when the trailer is pulled forward.

BRIEF DESCRIPTION OF THE DRAWINGS

In the drawings:

FIG. 2 is a side view in partial cross-section of a trailer hitch with the brake lockout mechanism of the present invention shown in the unlocked position;

FIG. 3 is a side view in partial cross-section showing a trailer hitch with the brake lockout mechanism of the present invention shown in the locked position;

DETAILED DESCRIPTION OF THE INVENTION

Figure 1:
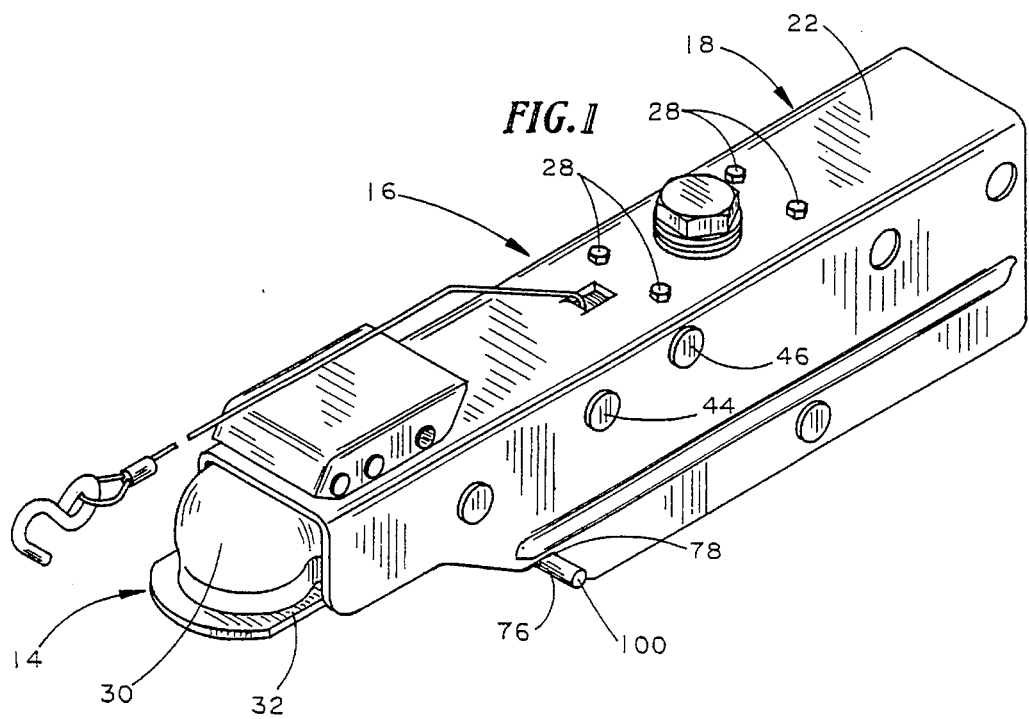
FIG. 1 is a perspective view of a trailer hitch provided with the brake lockout mechanism of the present invention.

The invention relates to a brake lockout mechanism 10 for a trailer hitch surge suppressor 12, designed to restrict movement of a forward portion 14 of a trailer hitch 16 toward a rearward portion 18 of the trailer hitch as a pulling vehicle (not shown) connected to the forward portion 14 moves a trailer (not shown) connected to the rearward portion 18 of the trailer hitch 16 rearward.

In the Figures, a braking mechanism 20 is shown within the rearward portion 18 of the trailer hitch 16 (FIG. 2). The rearward portion 18 of the trailer hitch 16 has a housing 22, preferably constructed of steel or similar durable material. The housing 22 not only affords the trailer hitch 16 an aesthetically pleasing appearance, but also protects the surge suppressor 12 and other internal parts of the trailer hitch 16 from exposure to the elements.

The surge suppressor 12 preferably consists of a hydraulic master cylinder 24 and a piston push rod 26 (FIG. 2). The master cylinder 24 is operably connected to the brakes on the trailer wheels (not shown). The master cylinder 24 is secured to the housing 22 by bolts 28. The forward portion 14 of the trailer hitch 16 consists of a ball-type hitch 30 and a body 32. A brake actuator 34 is secured to the body 32. A front slot 40 and a rear slot 42 are provided on the body. The forward portion 14 of the trailer hitch 16 is connected to the rearward portion 18 by a front bolt 44 and a rear bolt 46. The front bolt 44 passes through the front slot 42 on the body 32 and is secured on either side to the housing 22. The rear bolt 46 passes through the rear slot 40 and is also secured on either side to the housing 22.

The slots 40 and 42 are elongated to allow the forward portion 14 of the trailer hitch 16 to slide in relationship to the rearward portion 18 of the trailer hitch 16. A top portion 48 of the body 32 contacts a lower portion 50 of a cover 52. The cover 52 is the top portion of the housing 22. The top portion 48 of the body 32 slides against the lower portion 50 of the cover 52 as the forward portion 14 of the trailer hitch 16 slides back and forth relative to the rearward portion 18. The contact of the top portion 48 of the body 32 against the lower portion 50 of the cover 52 reduces the tendency of the forward portion 14 of the trailer hitch 16 to move toward the rearward portion 18, unless the pulling vehicle connected to the forward portion 14 is decelerating, or the trailer connected to the rearward portion 18 is accelerating.

A cap 54, consisting of a closed-end sleeve 56, welded to a plate 58 having a hole in the middle, is secured to the end of the piston push rod 26, to allow the braking mechanism 20 to be activated when the plate 58 is moved rearward and deactivated when the plate 58 is moved forward (FIG. 2). Positioned coaxially along the piston push rod 26, between the master cylinder 24 and the cap 54, is a spring 60.

Figure 7A:
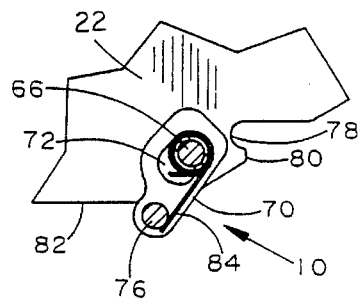
FIGS. 7a–c are side views in partial cross-section showing the brake lockout mechanism of the present invention in the unlocked, rotated, and locked positions.
Figure 4:
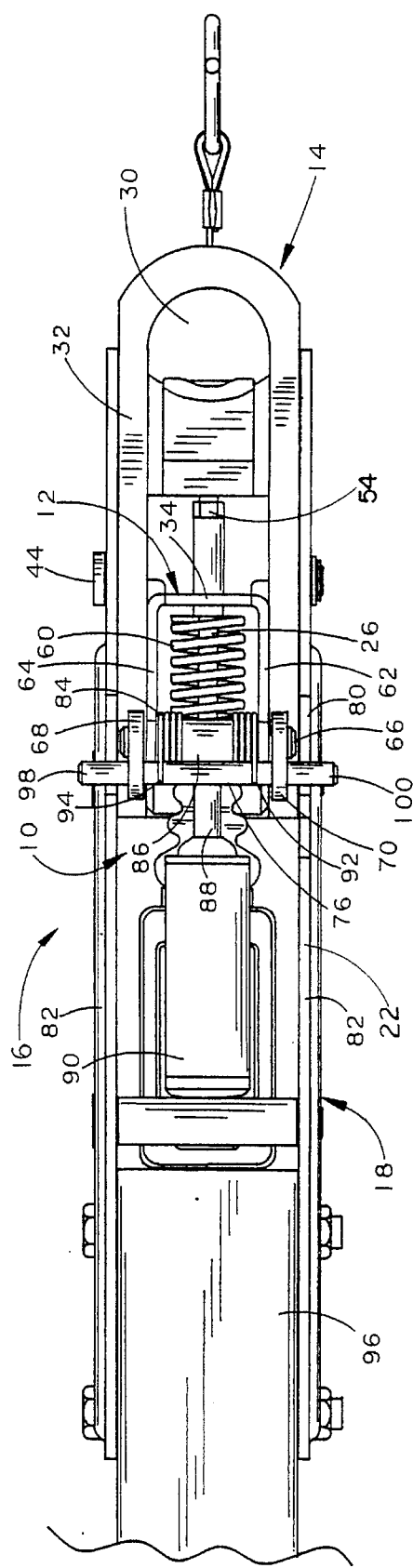
FIG. 4 is a bottom plan view of a trailer hitch showing the brake lockout mechanism of the present invention in the unlocked position.

Depending from the body 32 of the forward portion 14 of the trailer hitch 16 are a pair of brackets 62 and 64 (FIG. 4). Secured to and interconnecting the brackets 62 and 64 is a three-eights inch diameter steel spring pin 66. Pivotally connected to the spring pin 66, are a pair of struts 68 and 70. The struts 68 and 70 are each provided with a slot 72 to allow the struts 68 and 70 to be pivotally attached to the spring pin 66 between the arms 62 and 64 and the housing 22 (FIGS. 4 and 7a). Each slot 72 is preferably rectangular, with two rounded corners, to allow the struts 68 and 70 to pivot and slide in relationship to the spring pin 66.

Interconnecting the struts 68 and 70, is a one-half inch steel damper pin 76 (FIG. 4). The damper pin 76 passes through holes in the struts 68 and 70 and is secured to these struts 68 and 70 by weldments. The damper pin 76 is preferably slightly longer than the width of the housing 22 and is transversely positioned across the housing 22. The housing 22 is provided with a pair of notches 78 which are preferably semi-circular, with a diameter substantially equal to the diameter of the damper pin 76 (FIG. 2). Provided on the housing 22 below the notches 78 is a flange 80 extending slightly outward from the notch. From the flange 80, the housing 22 angles downward and curves into the bottom edge 82 of the housing 22.

Provided around each side of the spring pin 66 is a torsion spring 84 connected on one end to the arms 62 or 64 of the forward portion 14 of the trailer hitch 16 and on the other end to the damper pin 76 (FIGS. 4 and 7a). Each torsion spring 84 is connected to the arm 62 or 64 and damper pin 76 in an orientation which forces the damper pin 76 downward and rearward, away from the notches 78.

Preferably, the rearward portion 18 of the trailer hitch 16 is secured to a trailer (not shown), and the ball-hitch 30 of the forward portion 14 is releasably secured to a pulling ball 74 of the pulling vehicle (FIG. 2). As the trailer hitch 16 is pulled, the forward portion 14 and the rearward portion 18 of the trailer hitch 16 are pulled apart, thereby keeping the braking mechanism 20 from being actuated. As the pulling vehicle begins to slow, the momentum of the trailer forces the rearward portion 18 of the trailer hitch to slide toward the forward portion 14. As this happens, the actuator 34 presses the plate 58 which, in turn, pulls the closed-end sleeve 56. The closed-end sleeve 56 moves the piston push rod 26 into the master cylinder 24. As the piston push rod 26 moves into the master cylinder 24, the trailer brakes are actuated to slow the speed of the trailer. As the trailer slows relative to the pulling vehicle, the rearward portion 18 of the trailer hitch 16 slides away from the forward portion 14. The brake actuator 34 moves away from the master cylinder 24, and the spring 60 pushes against the cap 54. The cap 54 pulls the piston push rod 26 outward, thereby releasing the trailer brakes.

Backing a trailer with a surge suppressor similar to the surge suppressor 12 described above, can be very difficult. As the pulling vehicle moves rearward, the forward portion 14 of the trailer hitch 16 is moved toward the rearward portion 18 (FIG. 2). The brake actuator 34 secured to the forward portion 14 of the trailer hitch 16 moves into the cap 54. The cap 54 pushes the piston push rod 26 toward the master cylinder 24. The master cylinder 24, in turn, actuates the trailer brakes. Rearward pressure on the forward portion 14 of the trailer hitch 16 thereby causes the trailer brakes to be actuated, and prevents backing of the trailer.

Figure 5:
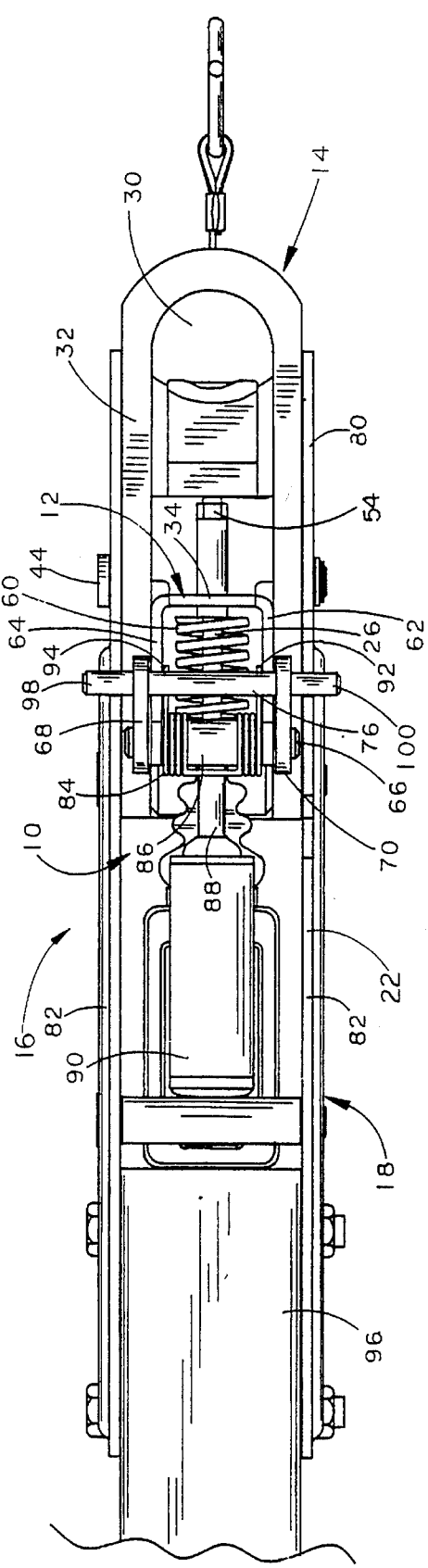
FIG. 5 is a bottom plan view of a trailer hitch showing the brake lockout mechanism of the present invention in the rotated position.
Figure 6:
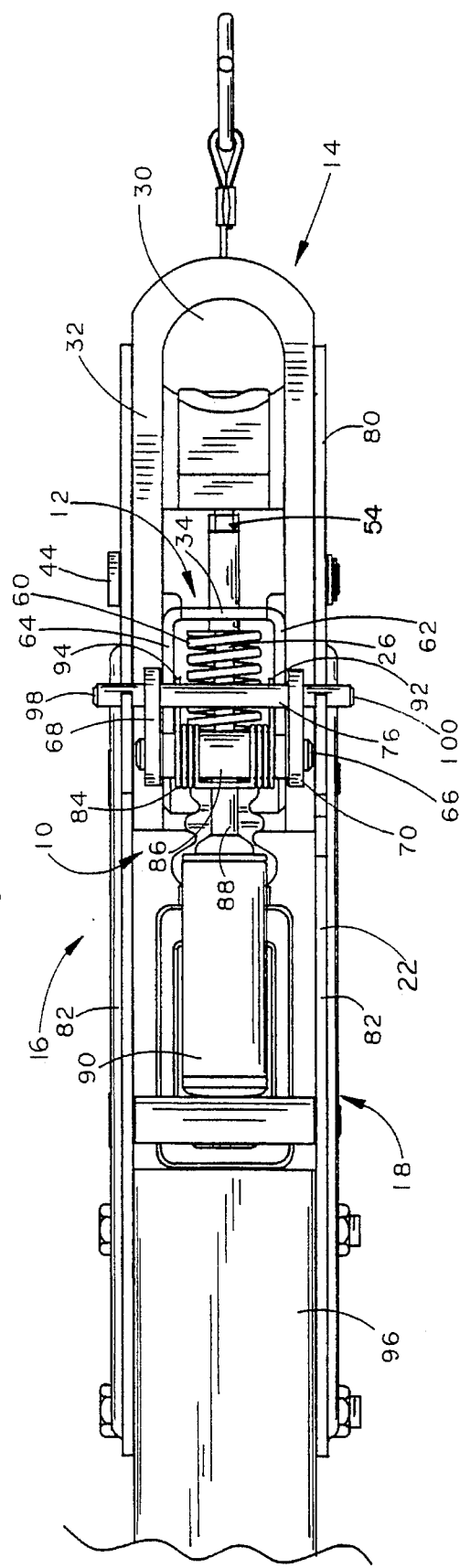
FIG. 6 is a bottom plan view of a trailer hitch showing the brake lockout mechanism of the present invention in the locked position.

To eliminate the surge suppression function of the surge suppressor 12 during backing, the damper pin 76 of the lockout device 78 is pulled forward and upward around the flange 80 until ends 86 and 88 of the damper pin 76 contact the housing 22 (FIG. 5). The damper pin 76 is then pushed rearward into the notches 78 which hold the damper pin 76 in position as the trailer is moved rearward (FIGS. 2 and 6).

As the pulling vehicle moves the trailer rearward, the forward portion 14 of the trailer hitch 16 is prevented from moving forward by the brake lockout mechanism 10 (FIG. 3). The brackets 62 and 64 of the forward portion 14 are operably connected by means of the spring pin 66 to the struts 68 and 70 and damper pin 76 of the brake lockout mechanism 10 (FIG. 6). The damper pin 76 braces the forward portion 14 of the trailer hitch 16 against the notches 78 in the rearward portion 18, thereby preventing the forward portion 14 from sliding rearward relative to the rearward portion 18 (FIGS. 2 and 3).

Figure 7B:
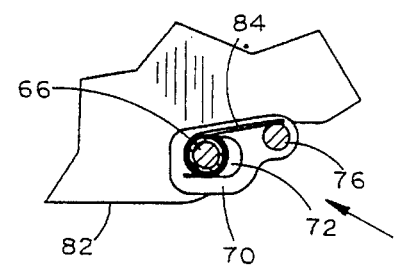
Figure 7C:
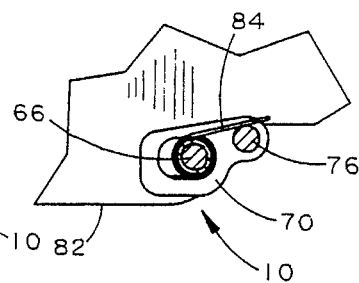

The brake lockout mechanism 10 may be manually disengaged by pulling the damper pin 76 forward and downward, away from the notches 78 in the housing 22 (FIGS. 7c, 7b, and 7a). The brake lockout mechanism 10 is also provided with an automatic release feature. Once the trailer has been backed into position, the pulling vehicle need only be moved slightly forward to release the brake lockout mechanism 10. As the pulling vehicle moves forward with the brake lockout mechanism 10 engaged, the forward portion 14 of the trailer hitch 16 slides forward relative to the rearward portion 18 (FIG. 5). The brackets 62 and 64 of the forward portion 14 push the spring pin 66 and the struts 68 and 70 forward. As the struts 68 and 70 move forward, the damper pin 76 moves forward and out of the notches 78 provided in the housing 22 (FIGS. 2 and 7b).

Once the damper pin 76 has cleared the flange 80, the torsion springs 84 force the damper pin 76 downward and rearward into contact with the bottom edge 82 of the housing 22 (FIG. 2). The torsion springs 84 thereafter maintain the damper pin 76 against the bottom edge 82 of the housing 22 during operation of the hitch 16, to prevent the damper pin 76 from catching the notches 78 and activating the brake lockout mechanism 10 during operation of the hitch 16. The torsion springs 84 also prevent the brake lockout mechanism 10 from swinging into, and possibly damaging, the housing 22 during operation of the trailer hitch 16.

The foregoing description and drawings merely explain and illustrate the invention, and the invention is not limited thereto, except insofar as the claims are so limited, as those skilled in the art who have the disclosure before them will be able to made modifications and variations therein without departing from the scope of the invention. By way of example, it should be clear that the lockout device 68 may be provided on the rearward portion 18 of the trailer hitch 16 with the damper pin 76 engaging notches in the rearward portion of the arms 62 and 64.

What is claimed is:

1. An automatic brake lockout for restricting operation of a trailer hitch surge suppressor, the automatic brake lockout being of a construction that when engaged, the automatic brake lockout restricts operation of the trailer hitch surge suppressor as a trailer hitch, operably coupled to the trailer hitch surge suppressor, is moved rearwardly, and when engaged, the automatic brake lockout continues to restrict operation of the trailer hitch surge suppressor until the automatic brake lockout is disengaged, the automatic brake lockout apparatus comprising:

a. a trailer connection member operably connected to the trailer hitch surge suppressor, said trailer connection member being provided with a notch;

b. a pulling vehicle connection member operably connected to the trailer hitch surge suppressor and slidably coupled to said trailer connection member in a manner which activates the surge suppressor upon movement of said trailer connection member toward said pulling vehicle connection member;

c. a lockout pin;

d. a pair of struts operably and pivotally connected to said pulling vehicle connection member and secured to said lockout pin in a manner which allows said pair of struts to be moved into an orientation where said lockout pin engages said notch of said trailer connection member; and e. means for automatically moving said lockout pin out of said notch upon movement of said trailer connection member away from said pulling vehicle connection member.

2. The automatic brake lockout of claim 1, wherein said automatic moving means is a spring operably connected to said pulling vehicle connection member.

3. An automatic brake lockout for restricting operation of a trailer hitch surge suppressor, the automatic brake lockout being of a construction that when engaged, the automatic brake lockout restricts operation of the trailer hitch surge suppressor as a trailer hitch, operably coupled to the trailer hitch surge suppressor, is moved rearwardly, and when engaged, the automatic brake lockout continues to restrict operation of the trailer hitch surge suppressor until the automatic brake lockout is disengaged, the automatic brake lockout apparatus comprising:

a. a trailer connection member operably connected to the trailer hitch surge suppressor, said trailer connection member being provided with a pair of notches;

b. a pulling vehicle connection member operably connected to the trailer hitch surge suppressor and slidably coupled to said trailer connection member in a manner which activates the surge suppressor upon movement of said trailer connection member toward said pulling vehicle connection member;

c. a lockout pin;

d. a strut operably and pivotally connected to said pulling vehicle connection member and secured to said lockout pin in a manner which allows said strut to be moved into an orientation where said lockout pin engages said pair of notches of said trailer connection member; and e. means for automatically moving said lockout pin out of said pair of notches upon movement of said trailer connection member away from said pulling vehicle connection member.

\* \* \* \* \*